(12) United States Patent
Lai

(10) Patent No.: US 9,743,727 B2
(45) Date of Patent: Aug. 29, 2017

(54) LUGGAGE CASE AND A METHOD FOR MAKING THE SAME

(71) Applicant: Wei-Hung Lai, Taichung (TW)

(72) Inventor: Wei-Hung Lai, Taichung (TW)

(*) Notice: Subject to any disclaimer, the term of this patent is extended or adjusted under 35 U.S.C. 154(b) by 695 days.

(21) Appl. No.: 14/267,560

(22) Filed: May 1, 2014

(65) Prior Publication Data

US 2015/0313338 A1    Nov. 5, 2015

(51) Int. Cl.

| | | |
|---|---|---|
| *A45C 7/00* | (2006.01) |
| *A45C 5/02* | (2006.01) |
| *A45C 5/03* | (2006.01) |
| *B29C 43/14* | (2006.01) |
| *A45C 13/36* | (2006.01) |
| *B29C 53/06* | (2006.01) |
| *B29L 31/00* | (2006.01) |

(52) U.S. Cl.
CPC .......... *A45C 5/02* (2013.01); *A45C 5/03* (2013.01); *A45C 13/36* (2013.01); *B29C 43/14* (2013.01); *B29C 53/063* (2013.01); *A45C 2005/037* (2013.01); *B29C 2043/141* (2013.01); *B29L 2031/7418* (2013.01)

(58) Field of Classification Search
CPC .......... A45C 5/02; A45C 3/001; A45C 13/36; A45C 3/00; A45C 3/02
USPC ........ 190/100, 107, 103, 115, 126; 206/509, 206/512, 562, 565, 594; 229/110, 114, 229/117.04, 143, 145, 148, 161–199
See application file for complete search history.

(56) References Cited

U.S. PATENT DOCUMENTS

| | | | | |
|---|---|---|---|---|
| 2,138,112 | A * | 11/1938 | Means | B65D 5/0015 229/112 |
| 3,147,908 | A * | 9/1964 | Clemens | B65D 5/007 206/512 |
| 7,281,616 | B2 * | 10/2007 | Peterson | A45C 7/0031 190/103 |
| 2010/0300825 | A1* | 12/2010 | Nordstrom | A45C 7/0036 190/107 |
| 2012/0175207 | A1* | 7/2012 | Scicluna | A45C 7/0022 190/107 |
| 2012/0325606 | A1* | 12/2012 | Scicluna | A45C 5/02 190/115 |

* cited by examiner

*Primary Examiner* — Fenn C Mathew
*Assistant Examiner* — Cynthia Collado
(74) *Attorney, Agent, or Firm* — Bruce Stone LLP; Joseph Bruce

(57) ABSTRACT

A luggage case includes a case woven by thermoplastic composite material, the case includes four integrally connected lateral walls, a bottom connected to the lateral walls, and four arc-shaped corners at cross points of the lateral walls, between each of the arc-shaped corners and the bottom is defined a hole. Any two of the lateral walls which are neighboring to each other are provided with a first overlapping portion and a second overlapping portion, respectively, and the first and second overlapping portions are integrally connected to each other without a notch formed therebetween, each of the corners of the case is folded to make the first and second overlapping portions overlapped with each other, so as to form a thickened pieces on an inner surface of each of the lateral walls.

12 Claims, 14 Drawing Sheets

LUGGAGE CASE AND A METHOD FOR MAKING THE SAME

BACKGROUND OF THE INVENTION

Field of the Invention

The present invention relates to a hard luggage case, and more particularly to a hard luggage case and a method for making the same.

Description of the Prior Art

The existing luggage cases are generally divided into soft cases which are made of flexible material and hard cases which are made of rigid plastic material. Hard cases have better ability to resist deformation, and soft cases provide better protection to the content stored therein. However, hard cases usually don't have attractive appearance and good sense of touch, and the weight of the hard cases is relative heavy.

With the advancement in material technology, as shown in FIGS. 1-3, thermoplastic composites are woven into a rectangular plate 10, four corners of the rectangular plate 10 are cut off to form four cutting notches 11, then four edges 111 of the plate 10 are folded up to convert the 2D flat plate 10 into a 3D case 100. Finally, the case 100 is set in shape by shape processing, such as thermoplastic or mold pressing, so as to form a lightweight case 100 with strong structural strength.

The edges 111 of the plate 10 are formed with assembling apertures 112, through which, rigid protection members 13 are assembled to the plate 10 to fix the edges 111. However, the edges 111 are not connected together as a unitary structure but are separated from one another by the cutting notches 11, which will reduce the structural strength of the case. Besides, the use of the right protection members 13 increases the weight of the luggage case A.

The present invention has arisen to mitigate and/or obviate the afore-described disadvantages.

SUMMARY OF THE INVENTION

The primary objective of the present invention is to provide a luggage case and a method for making the same, wherein the luggage case is made by a plate which is provided with no notches at the corners thereof, and the plate is converted into a three dimensional case by being subjected to folding and mold pressing process, so that the structural strength of the case is effectively reduced without increasing the weight of the case.

To achieve the above objective, a luggage case in accordance with the present invention comprises a case woven by thermoplastic composite material, the case comprises four integrally connected lateral walls, a bottom connected to the lateral walls, and four arc-shaped corners at cross points of the lateral walls, between each of the arc-shaped corners and the bottom is defined a hole. Any two of the lateral walls which are neighboring to each other are provided with a first overlapping portion and a second overlapping portion, respectively, and the first and second overlapping portions are integrally connected to each other without a notch formed therebetween, each of the corners of the case is folded to make the first and second overlapping portions overlapped with each other, so as to form a thickened pieces on an inner surface of each of the lateral walls.

Between each of the holes and two lateral edges of each of the corners are defined a first folding line and an assistant folding line which have equal length and are perpendicular to each other, and between each of the holes and a tip end of a corresponding one of the corners is defined a second folding line.

A method for making the luggage case of the present invention comprises the following steps:

providing a rectangular flexible plate which is woven by thermoplastic composites material; forming four holes in four corners of the plate, each of the holes being located at a position which is close to and perpendicularly equidistant from two lateral edges of the corresponding corner; defining a first folding line and an assistant folding line, respectively, by connecting each of the holes to the two lateral edges of a corresponding one of the corners in a perpendicular manner, and defining a second folding line by connecting each of the holes to a tip end of the corresponding one of the corners; overlapping the area between the first and second folding lines with the area between the assistant folding line and the second folding line to form a thickened piece, by folding the four corners; converting the plate into a three dimensional case with four lateral walls and a bottom, by pressing the thickened piece against an inner surface of the plate; and setting the three dimensional case into shape to make a case of luggage with integral thickened corners, by subjecting it to mold pressing.

Preferably, the thickened pieces are abutted against the inner surface of the lateral walls around the case in a clockwise or counterclockwise manner. Or, the four lateral walls of the case are divided into two opposite first lateral walls and two opposite second lateral walls which are longer than the first lateral walls, and the thickened pieces are abutted against an inner surface of the first or second lateral walls. With the thickened pieces, the structure strength of the corners of the cases is improved.

Preferably, the first and second overlapping portions can be glued together, or can be formed with apertures, through which, the first and second overlapping portion can be fixed together by fixing members.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 4-9D, a luggage case and a method for making the same in accordance with the present invention are shown.

Figure 8A:
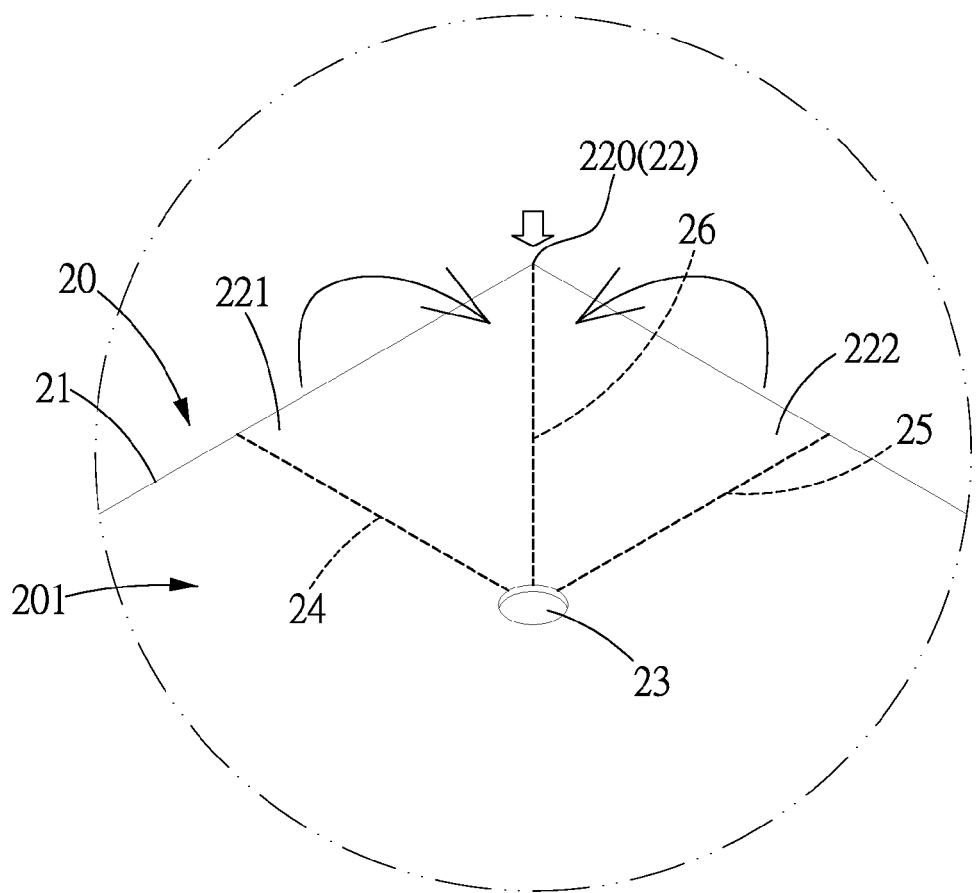
FIG. 8A shows the first step of folding the corner of the luggage case in accordance with the present invention.
Figure 8B:
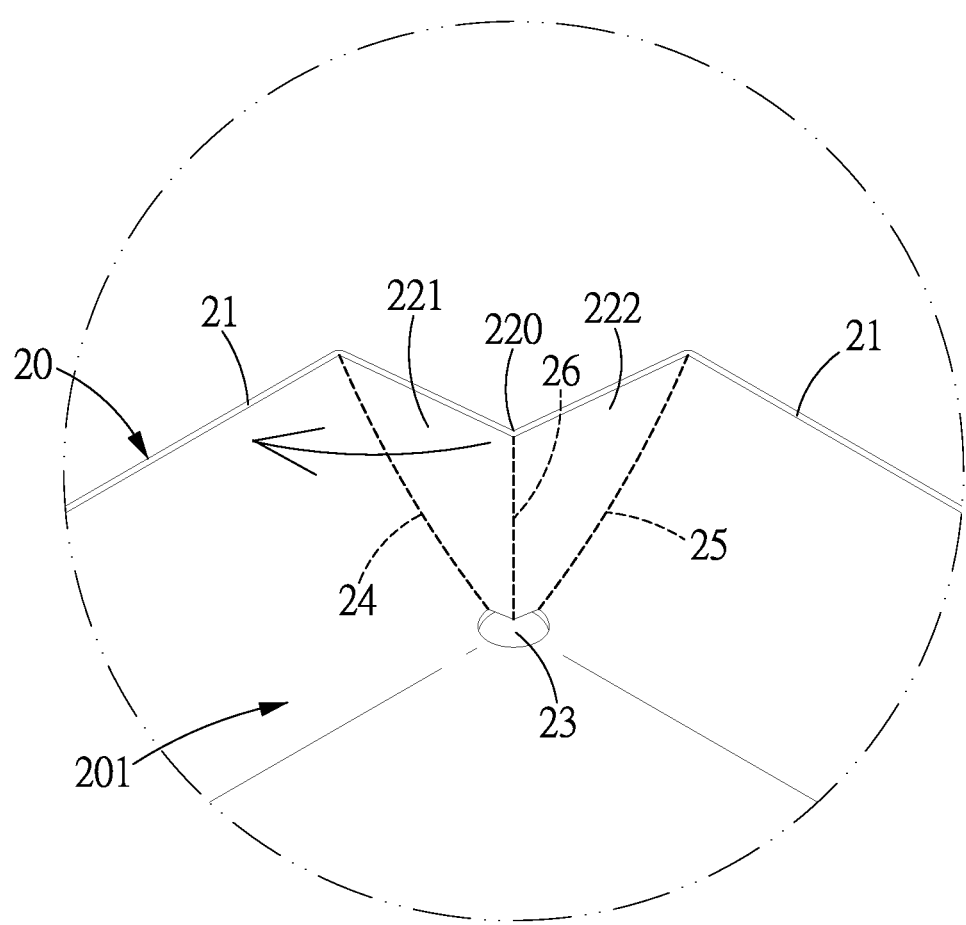
FIG. 8B shows the second step of folding the corner of the luggage case in accordance with the present invention.
Figure 8C:
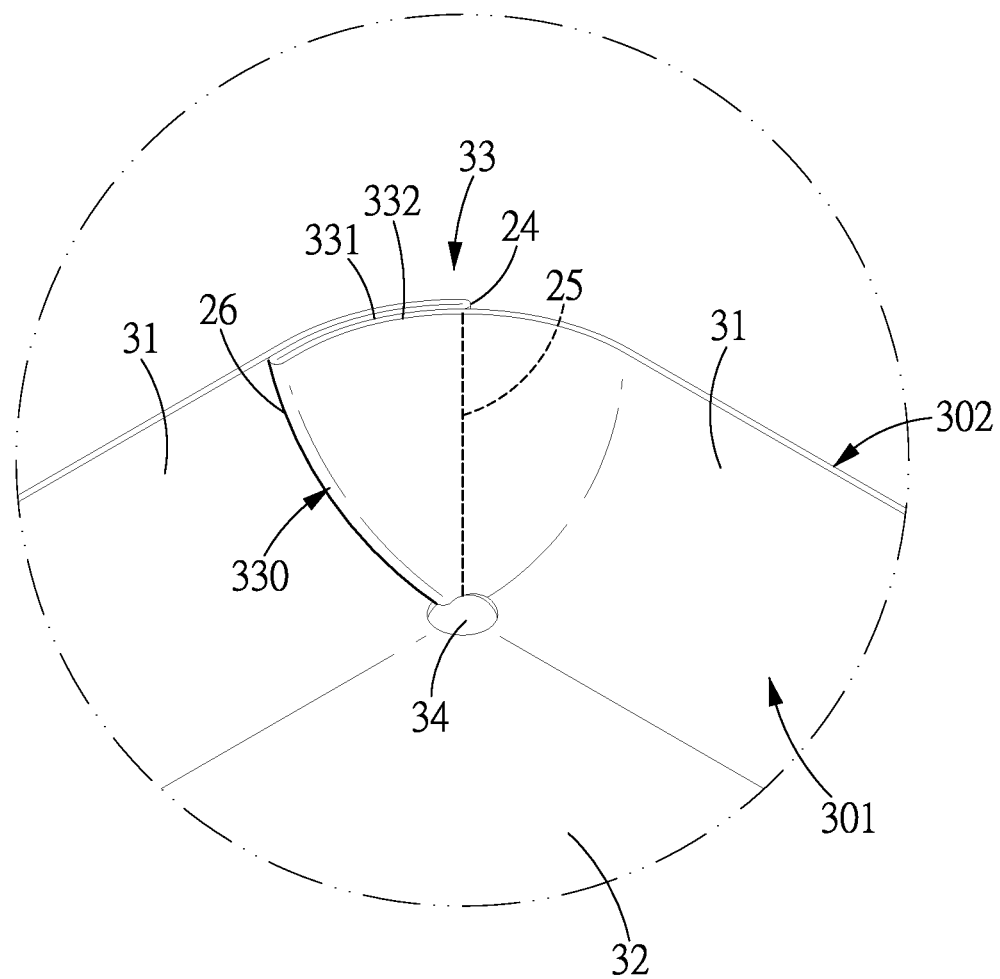
FIG. 8C shows the final step of folding the corner of the luggage case in accordance with the present invention.

The luggage case of the present invention is made by folding a flat plate 20 into a three dimensional case 30 which is then set in shape by being subjected to shaping process. The flat plate 20 is woven by thermoplastic material, such as PVC (Polyvinyl chloride), PP (Polypropylene) or PET (Polyethylene terephthalate), and then is converted into the three dimensional case 30 by being subjected to folding and shaping process. A method for making the three dimensional case 30 comprises the following steps:

A. providing a rectangular flexible plate which is woven by thermoplastic composites material;

B. forming four holes 23 in four corners of the plate, as shown in FIG. 8A, each of the holes 23 is located at a position which is close to and perpendicularly equidistant from two lateral edges of the corresponding corner;

C. defining a first folding line 24 and an assistant folding line 25, respectively, by connecting each of the holes 23 to the two lateral edges of the corresponding corner in a perpendicular manner, and defining a second folding line 26 by connecting the hole 23 to the tip end of the corresponding corner;

D. overlapping the part between the first and second folding lines 24, 26 with the part between the assistant folding line 25 and the second folding line 26 to form a thickened piece 330, by folding the four corners, as shown in FIGS. 8B and 8C;

E. converting the plate into a three dimensional case with four lateral walls and a bottom, by pressing the thickened piece 330 against an inner surface of the plate, as shown in FIGS. 8B and 8C; and F. setting the three dimensional structure into shape to make a three dimensional case 30 with integral thickened corners, by subjecting it to mold pressing.

Figure 1:
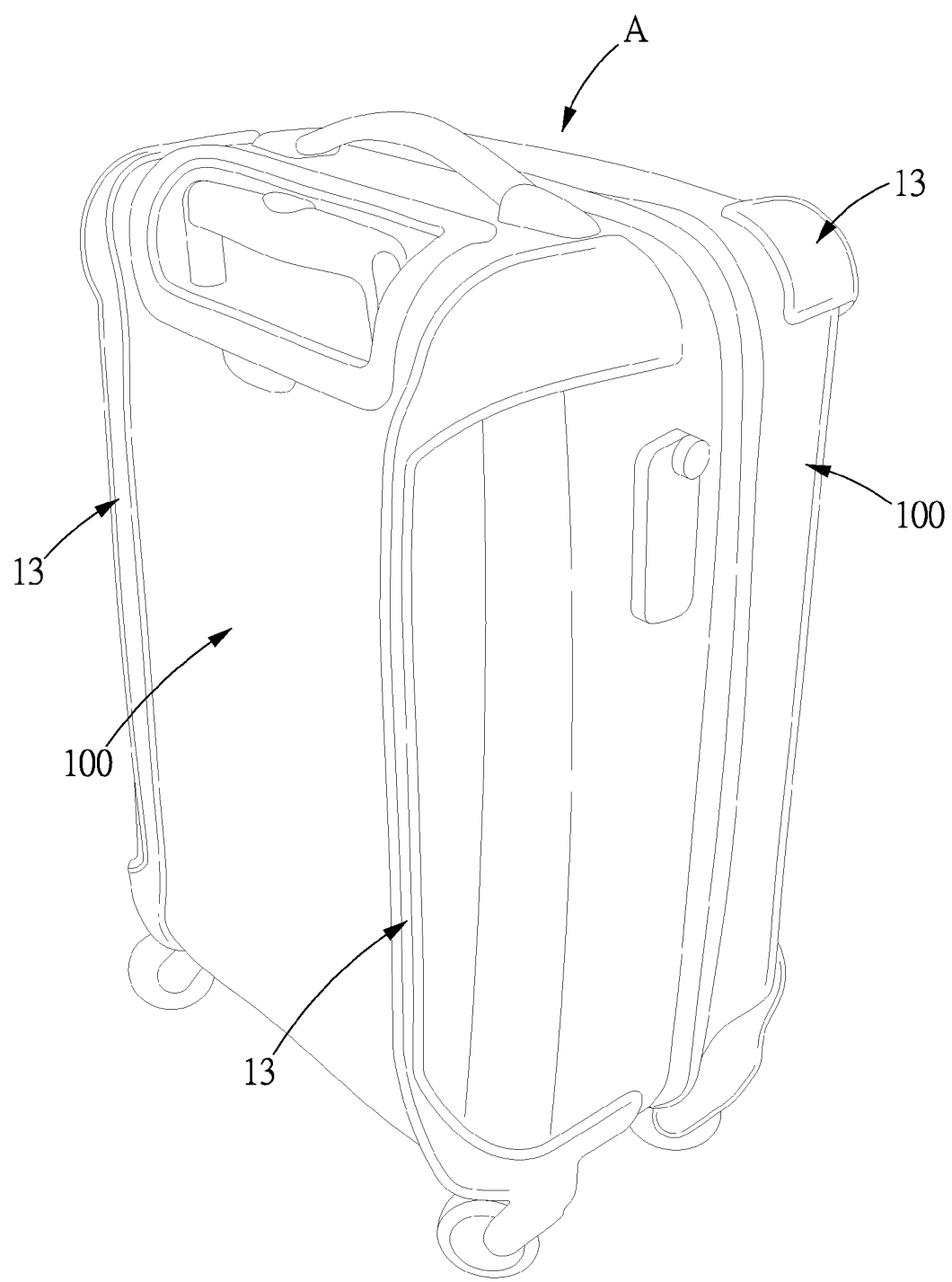
FIG. 1 shows a conventional luggage case.
Figure 2:
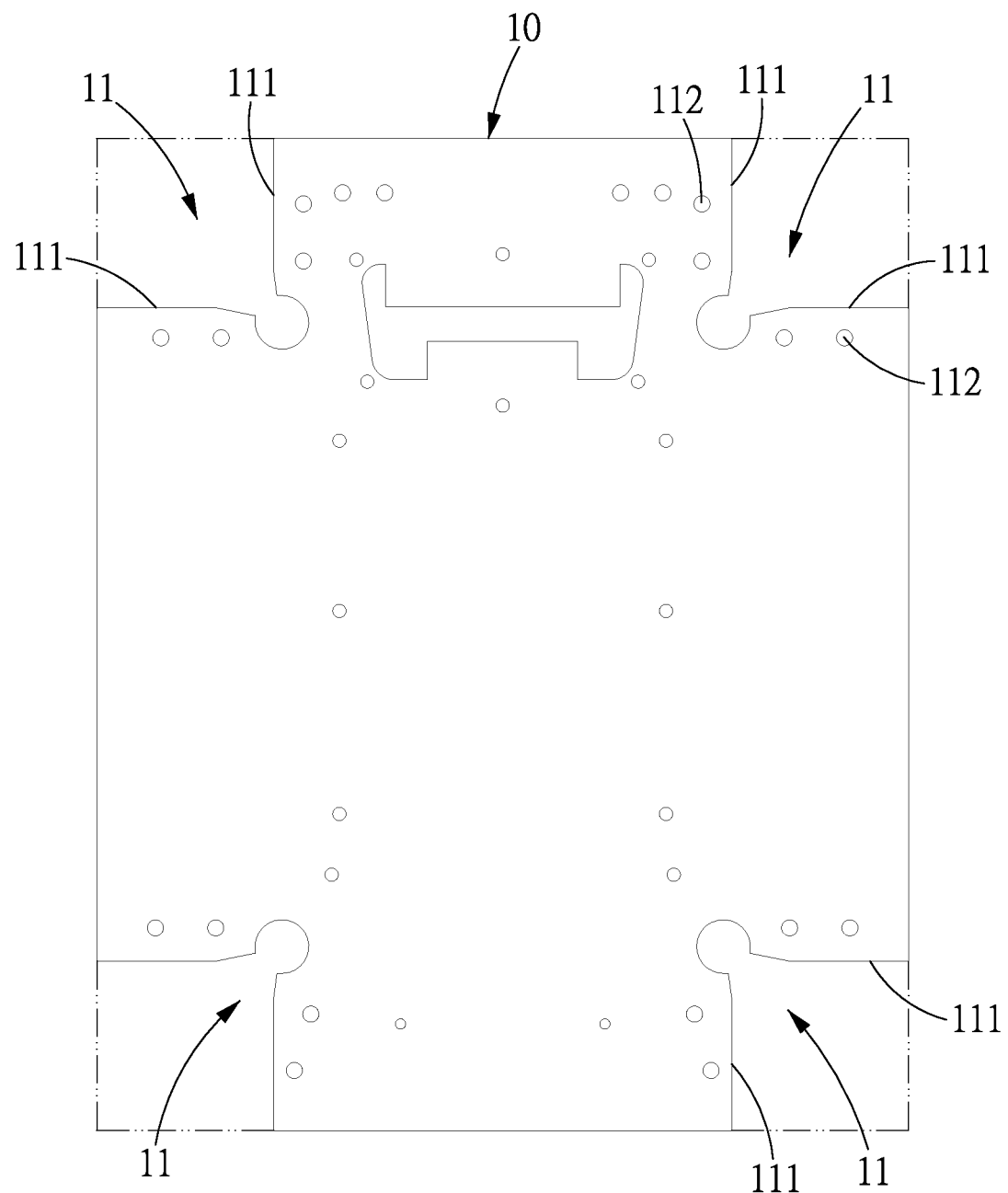
FIG. 2 is an unfolded view of the extensible-rod side of the conventional luggage case.
Figure 3:
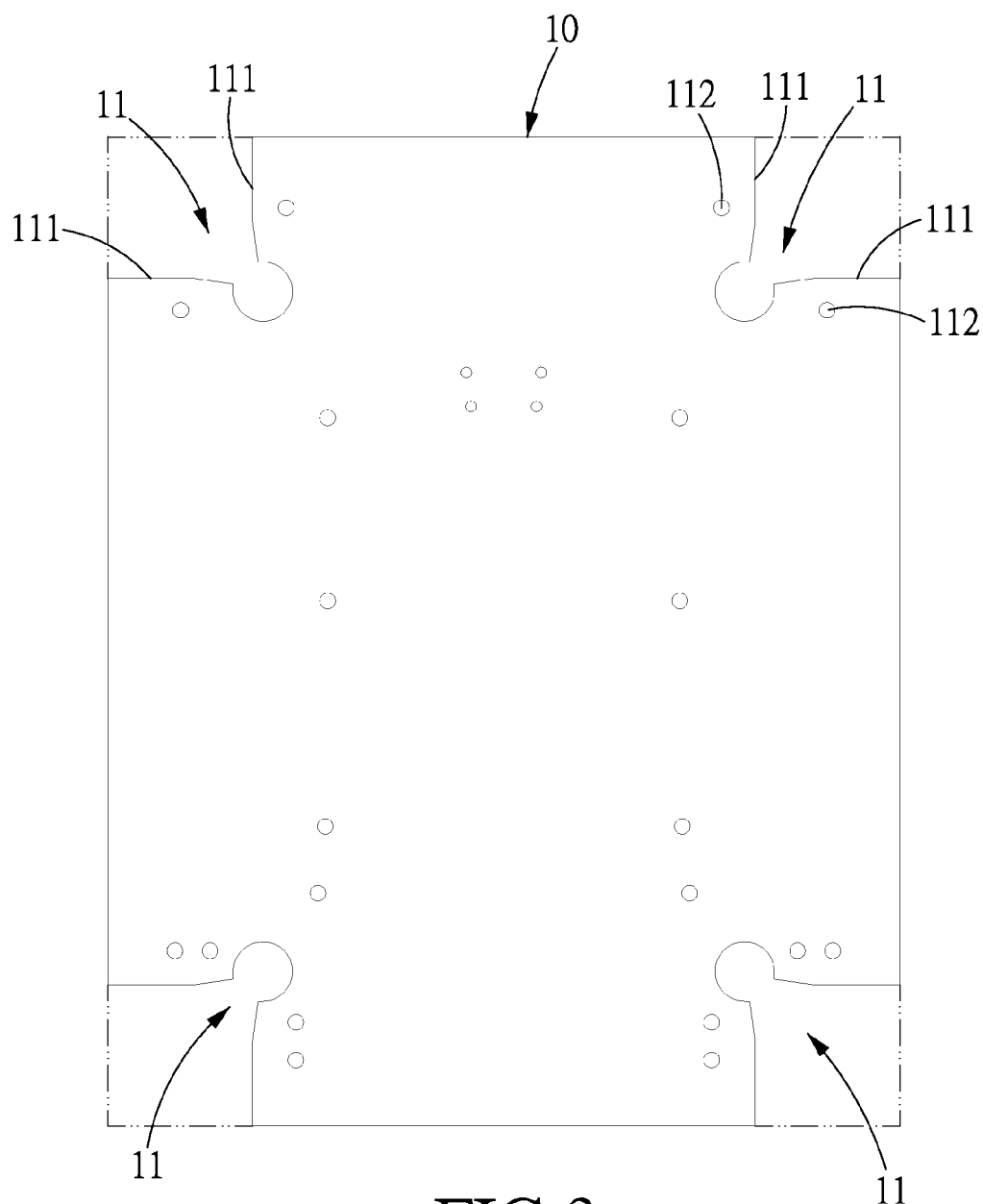
FIG. 3 is an unfolded view of the front side of the conventional luggage case.
Figure 4:
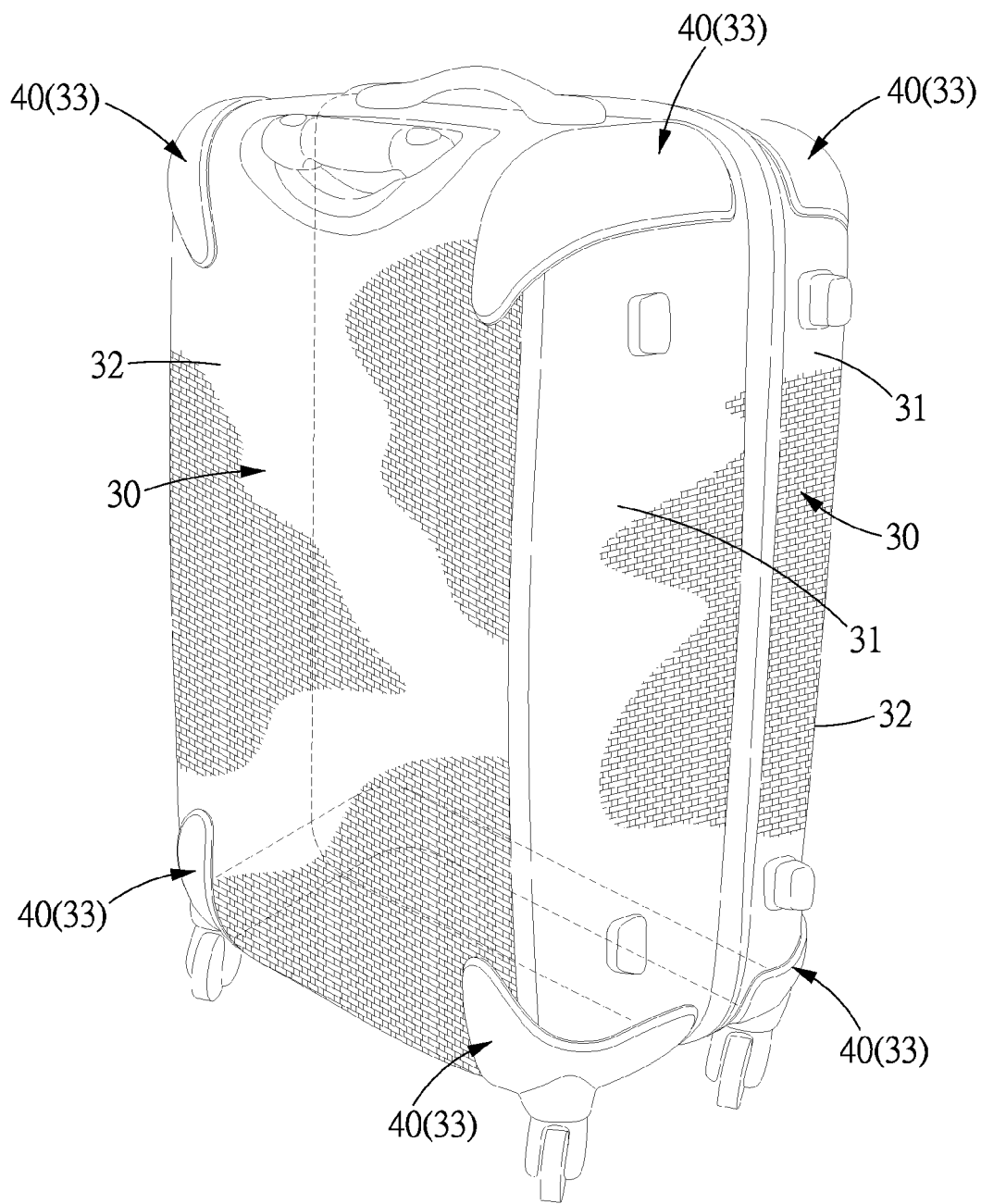
FIG. 4 is a perspective view of a luggage case in accordance with the present invention.
Figure 5:
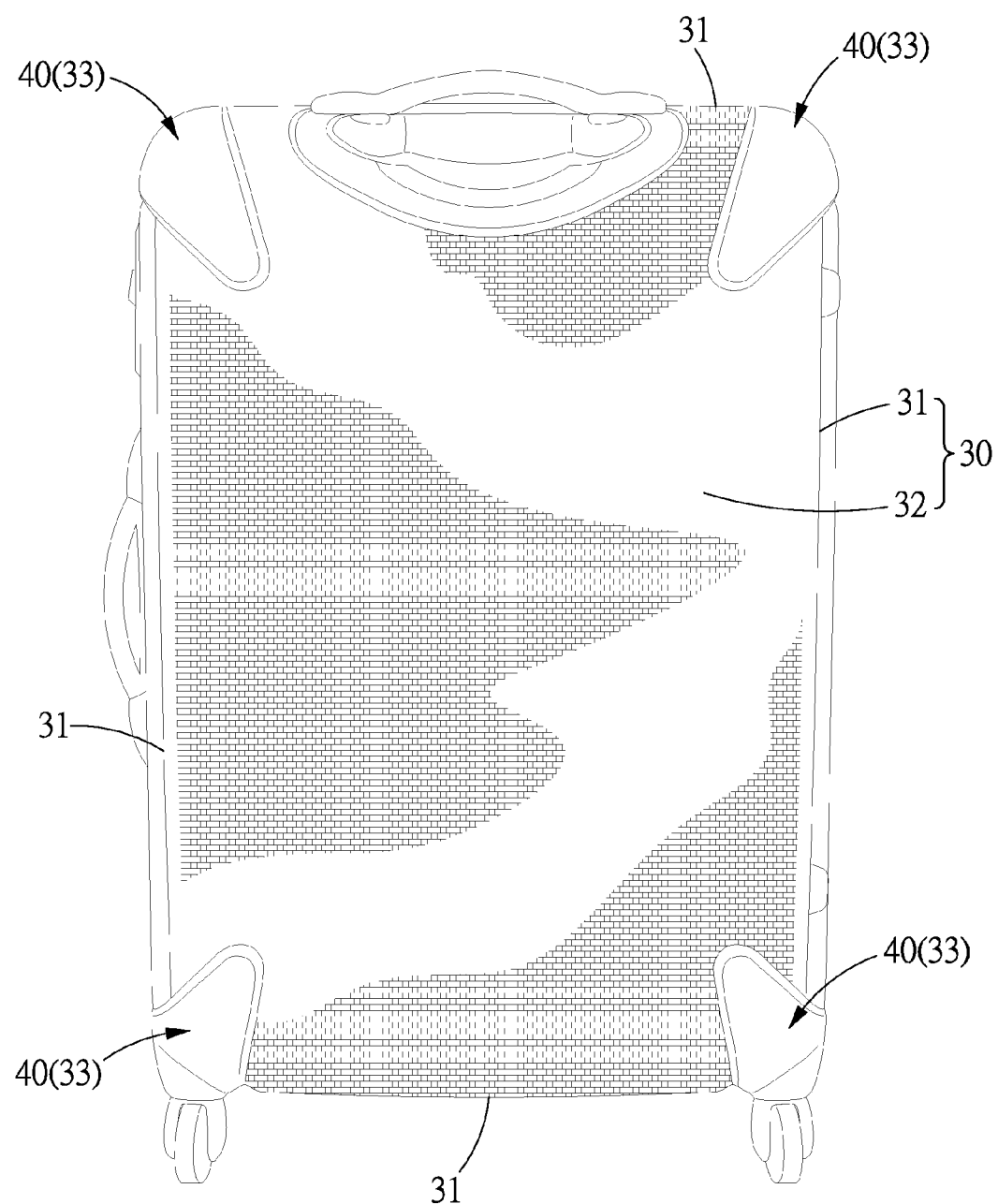
FIG. 5 shows the luggage case in accordance with the present invention.
Figure 6:
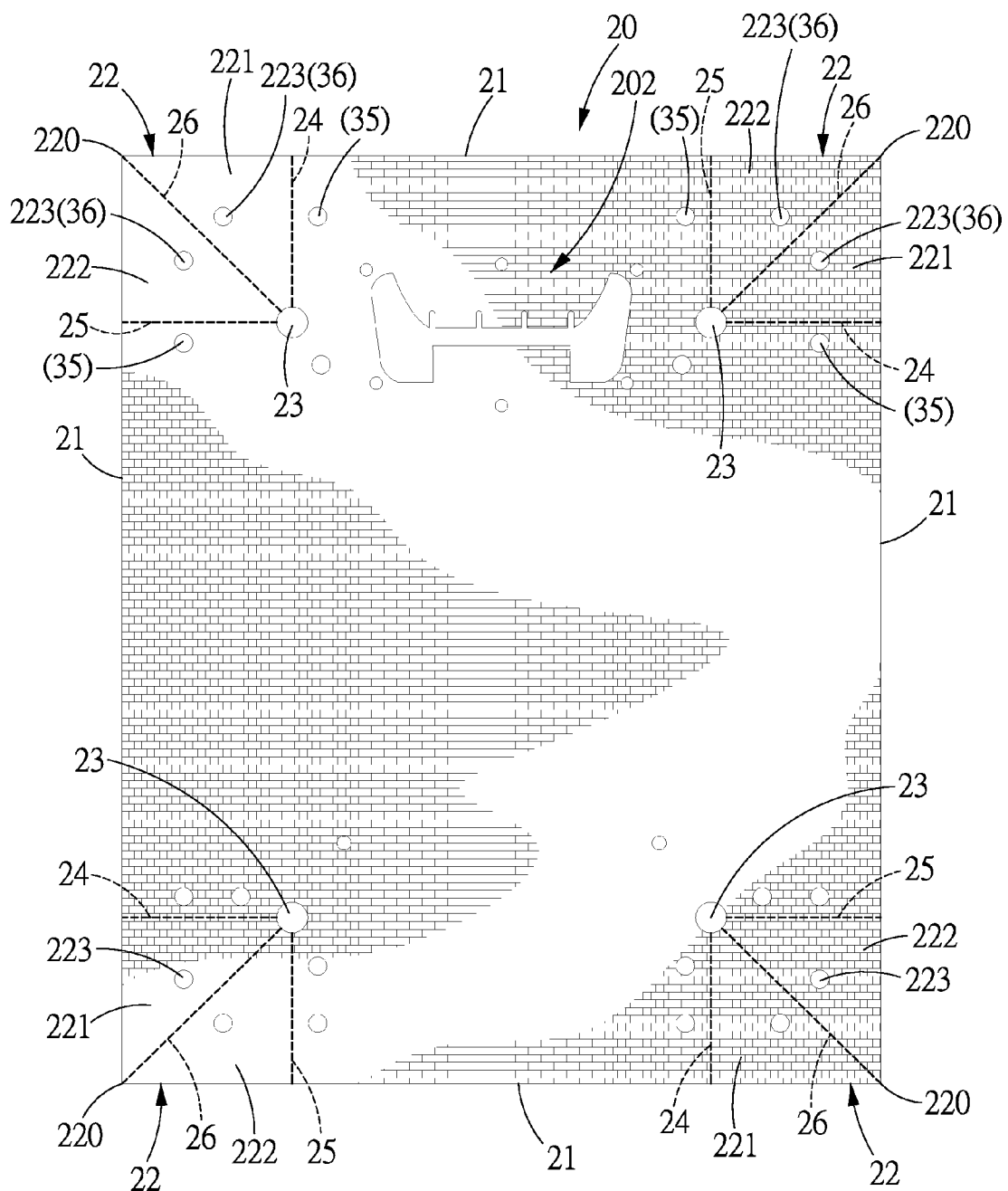
FIG. 6 is an unfolded view showing the front side of the luggage case in accordance with the present invention.
Figure 7:
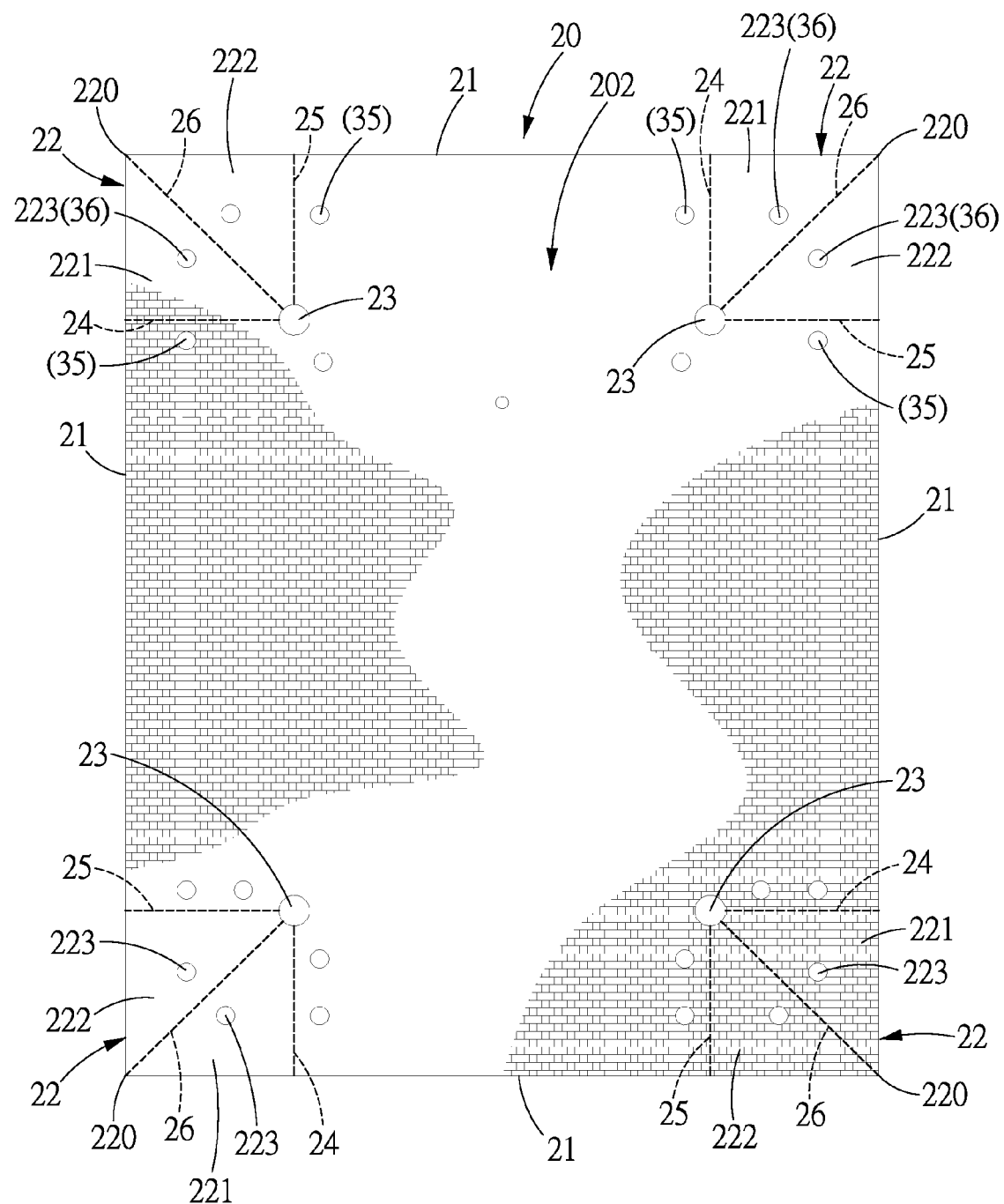
FIG. 7 is an unfolded view showing the rear side of the luggage case in accordance with the present invention.

FIG. 6 shows the plate 20 used to form the extensible-rod side of the luggage case, and FIG. 7 shows the plate 20 used to form lateral sides of the luggage case. The plate 20 which is converted into the three dimensional case 30 by being subjected to folding and mold pressing includes four lateral edges 21 and four corners 22 connected to the four lateral edges 21. The plate 20 is provided with four holes 23 located close to the four corners 22. Between each of the holes 23 and two lateral edges 21 of each of the corners 22 are defined the first folding line 24 and the assistant folding line 25 which have equal length and are perpendicular to each other. Between each of the holes 23 and the tip end 220 of the corresponding one of the corners 22 is defined a second folding line 26. The area between the first and second folding lines 24, 26 is defined as a first overlapping area 221, the area between the second folding line 26 and the assistant folding line 25 is defined as a second overlapping area 222, in the first and second overlapping areas 221, 222 are formed a plurality of aligned apertures 223 which will be aligned after folding, and are used to fix other fixing members.

Referring back to FIGS. 8A-8C again, folding the flat plate 20 along the first folding line 24, the assistant folding line 25 and the second folding line 26 to make the three dimensional case 30, as shown in FIGS. 4, 5, 8C and 9A-9D. The three dimensional case 30 includes four lateral walls 31, a bottom 32 connected to the four lateral walls 31, and four arc-shaped corners 33 at the cross points of the lateral walls 31. Between each of the arc-shaped corners 33 and the bottom 32 is defined a hole 34. Any two neighboring lateral walls 31 are provided with a first overlapping portion 331 and a second overlapping portion 332, respectively, and the first and second overlapping portions 331, 332 are integrally connected to each other without a notch formed therebetween. Each of the corners of the case 30 is folded to make the first and second overlapping portions 331, 332 overlapped, so as to form a thickened piece 330 on an inner surface 301 of each of the lateral walls 31, which improves the structure strength of the case 30. Please refer then to FIGS. 4 and 5, since there are no cutting notches or holes in the corners 22 of the plate 20 which is used to make the case 30, it only needs to use a small rigid protection member 40 which is only big enough to cover the arc-shaped corners 33 of the case 30, without having to use a large rigid protection member 40 to cover a large part of the case, which will considerable increase in the weight of the luggage case.

In this embodiment, as shown in FIGS. 6 and 7, the case 30 is provided with a plurality of assembling holes 35 for assembling of rigid protection member 40 at each of the arc-shaped corners 33, and the assembling holes 35 are located beside the first folding line 24 and the assistant folding line 25 before the plate 20 is folded into the case 30. Besides, the apertures 36 at the arc-shaped corners 33 of the case 30, which are formed by the apertures 36 of the first and second overlapping portions 331, 332, can be used to fix other fixing members.

Figure 9A:
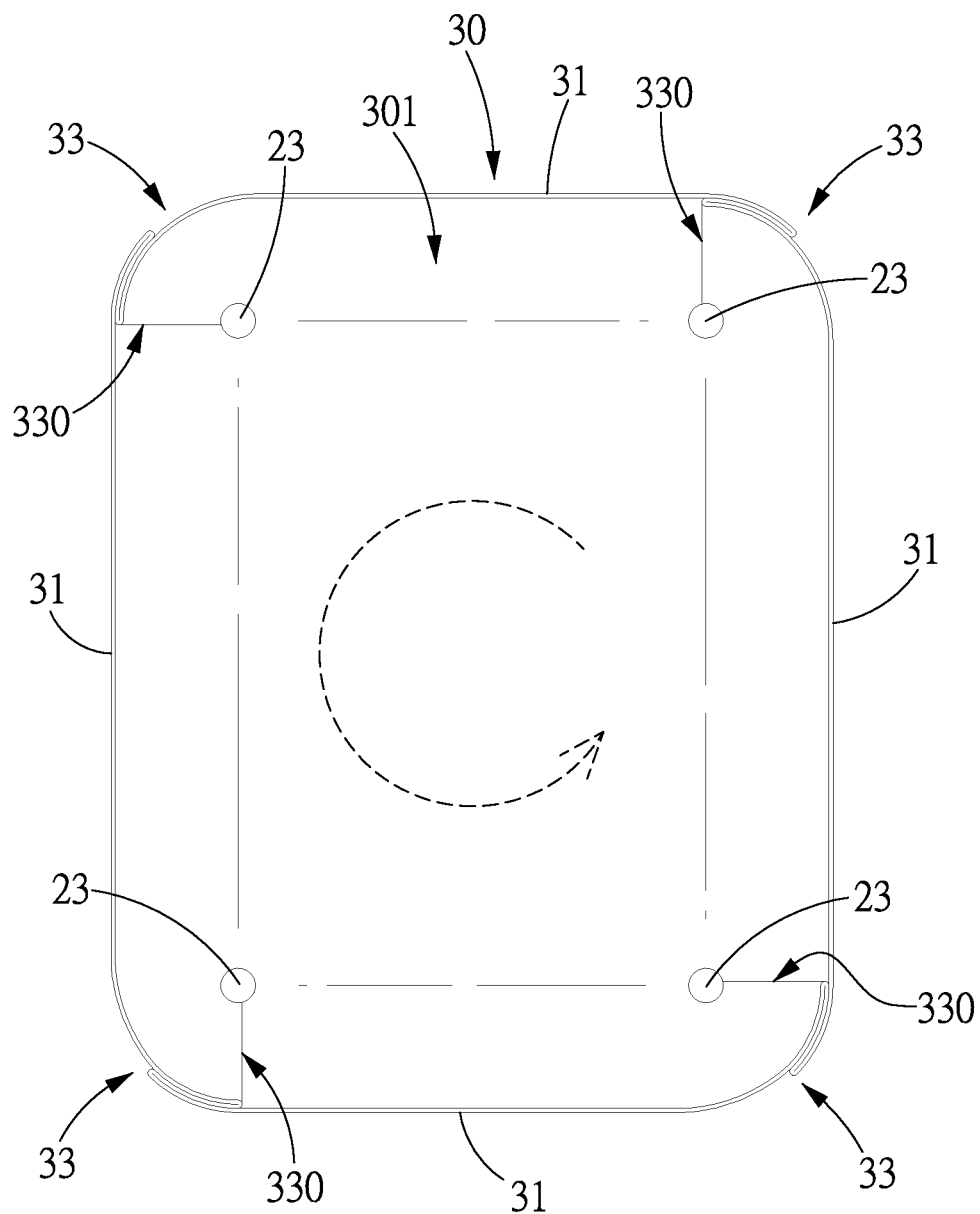
FIG. 9A shows that the four thickened pieces of the present invention are abutted against the inner surface of the lateral walls around the case in a counterclockwise manner.
Figure 9B:
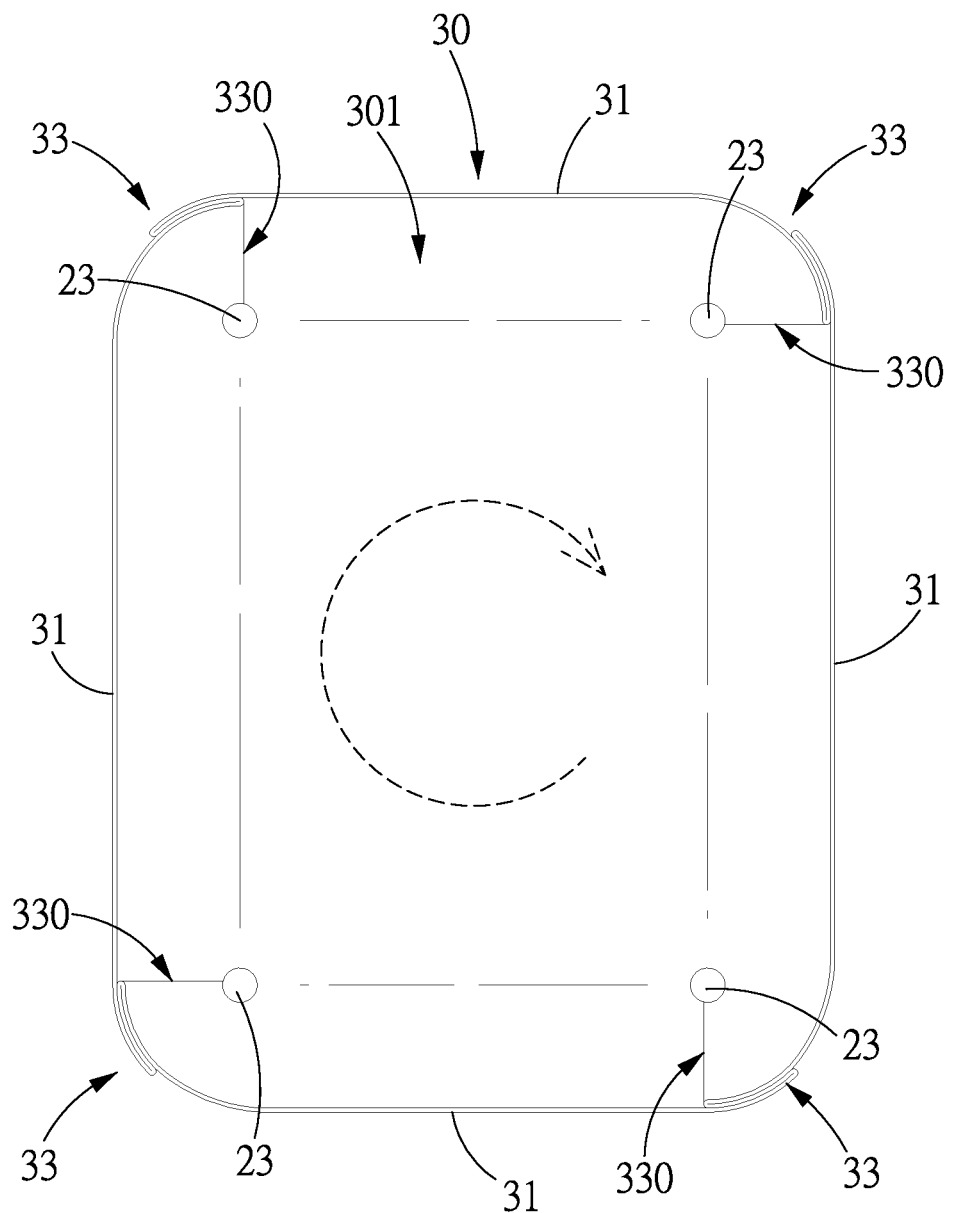
FIG. 9B shows that the four thickened pieces of the invention are abutted against the inner surface of the lateral walls around the case in a clockwise manner.
Figure 9C:
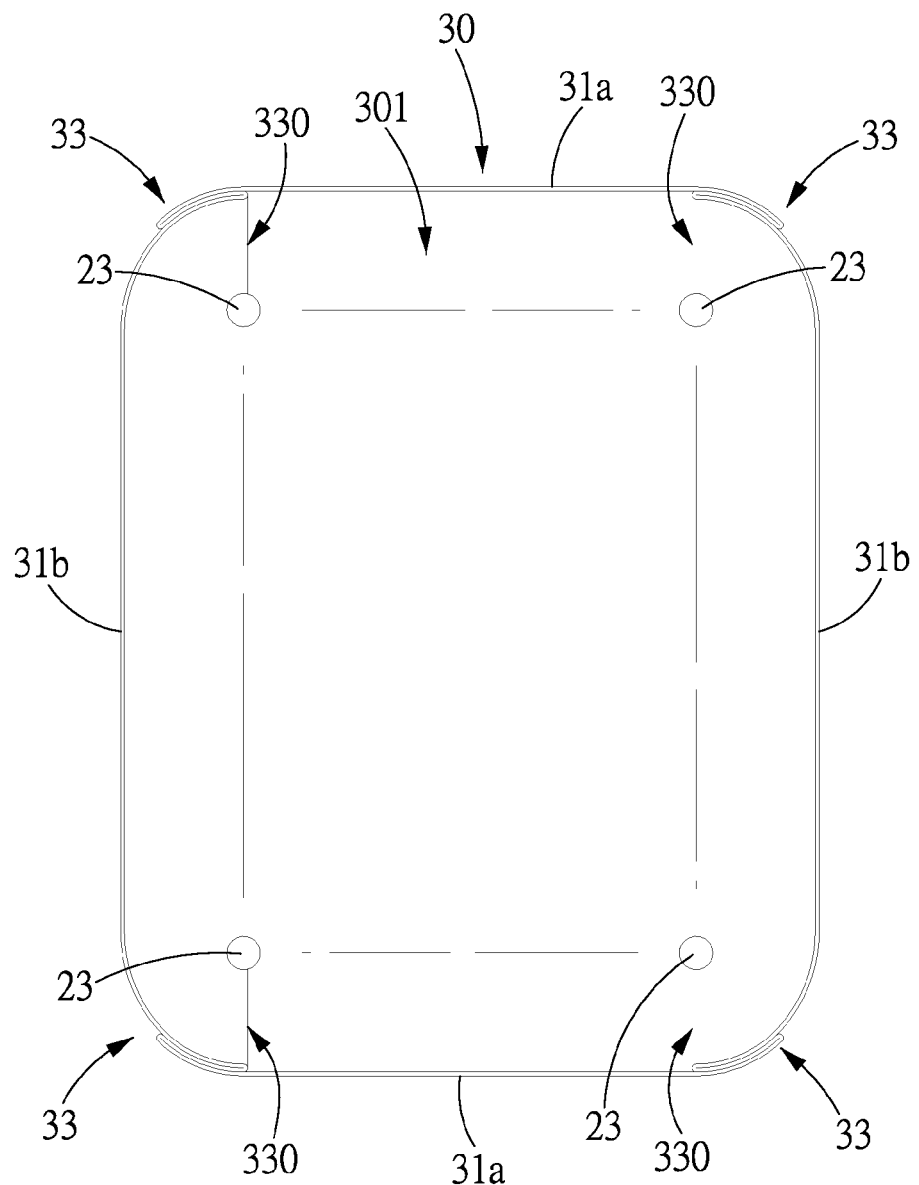
FIG. 9C shows that the thickened pieces are abutted against an inner surface of the first lateral walls of luggage case in accordance with the present invention.
Figure 9D:
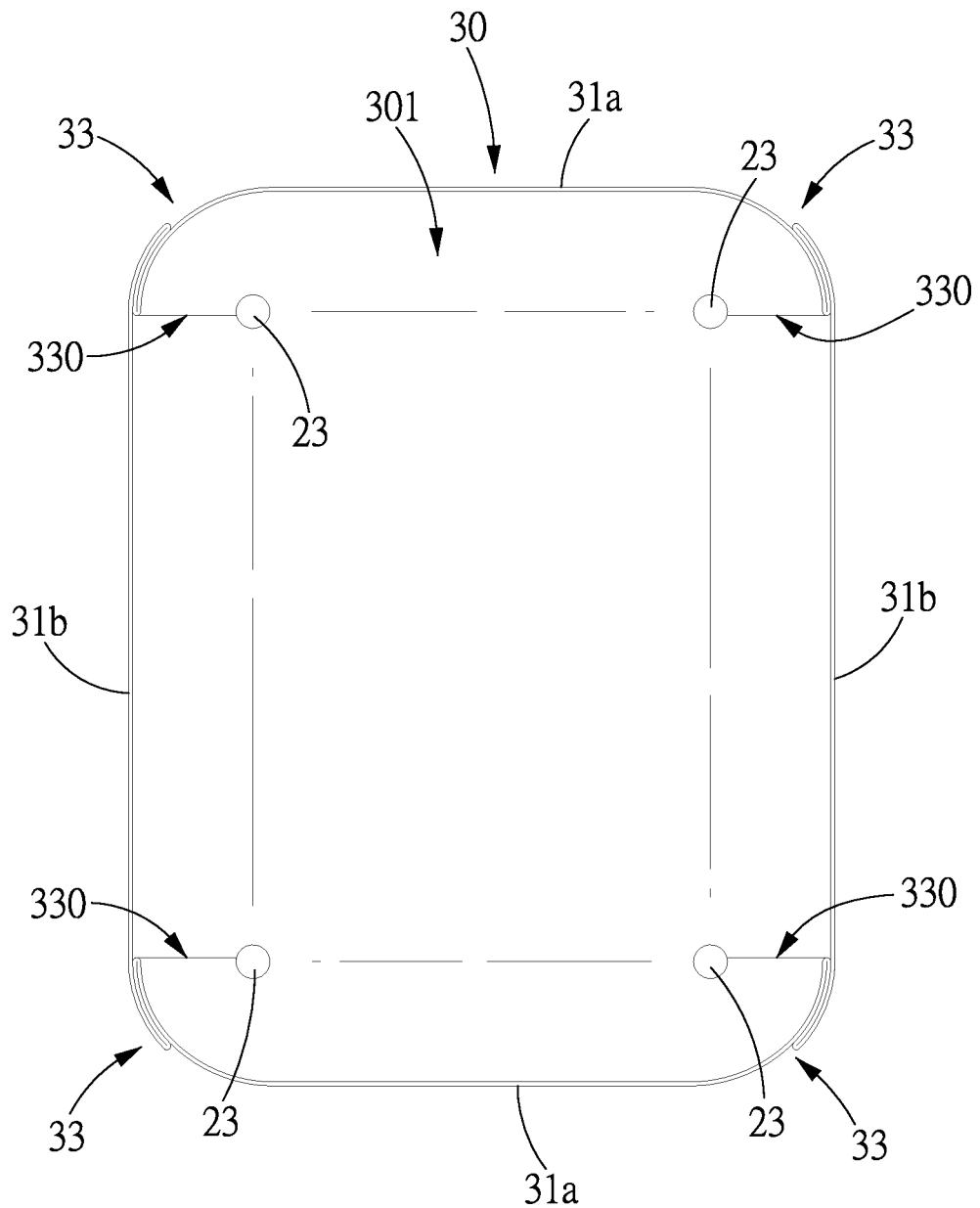
FIG. 9D shows that the thickened pieces are abutted against an inner surface of the second lateral walls of the luggage case in accordance with the present invention.

Referring then to FIGS. 9A-9D, to make the case 30 be uniform structure, the four thickened pieces 330 formed by overlapping of the first and second overlapping portions 331, 332 can be abutted against the inner surface 301 of the lateral walls 31 around the case 30 in a counterclockwise manner, as shown in FIG. 9A, or in a clockwise manner as shown in FIG. 9B. More specifically, the four lateral walls 31 of the case 30 are divided into two opposite first lateral walls 31a and two opposite second lateral walls 31b which are longer than the first lateral walls 31a, then the four thickened pieces 330 are abutted against the inner surface of the first or second lateral walls 31a, 31b.

While we have shown and described various embodiments in accordance with the present invention, it is clear to those skilled in the art that further embodiments may be made without departing from the scope of the present invention.

What is claimed is:

1. A luggage case comprising a case woven by thermoplastic composite material, the case comprising four integrally connected lateral walls, a bottom connected to the lateral walls, and four arc-shaped corners at cross points of the lateral walls, between each of the arc-shaped corners and the bottom being defined a hole; the luggage being characterized in that:

any two of the lateral walls which are neighboring to each other are provided with a first overlapping portion and a second overlapping portion, respectively, and the first and second overlapping portions are integrally connected to each other without a notch formed therebetween, each of the corners of the case is folded to make the first and second overlapping portions overlapped with each other, so as to form a thickened piece on an inner surface of each of the lateral walls.

2. The luggage case as claimed in claim 1, wherein the case is made by a plate which is subjected to folding and mold pressing process, the plate includes four lateral edges and four corners connected to the four lateral edges, the plate is provided with four said holes located close to the four corners, between each of the holes and two lateral edges of each of the corners are defined a first folding line and an assistant folding line which have equal length and are perpendicular to each other, and between each of the holes and a tip end of a corresponding one of the corners is defined a second folding line.

3. The luggage case as claimed in claim 1, wherein each two of the first and second overlapping portions are overlapped to form a thickened piece, and the thickened pieces are abutted against the inner surface of the lateral walls around the case in a counterclockwise manner.

4. The luggage case as claimed in claim 1, wherein each two of the first and second overlapping portions are overlapped to form a thickened piece, and the thickened pieces are abutted against the inner surface of the lateral walls around the case in a clockwise manner.

5. The luggage case as claimed in claim 1, wherein each two of the first and second overlapping portions are overlapped to form a thickened piece, the four lateral walls of the case are divided into two opposite first lateral walls and two opposite second lateral walls which are longer than the first lateral walls, and the thickened pieces are abutted against an inner surface of the first lateral walls.

6. The luggage case as claimed in claim 1, wherein each two of the first and second overlapping portions are overlapped to form a thickened piece, the four lateral walls of the case are divided into two opposite first lateral walls and two opposite second lateral walls which are longer than the first lateral walls, and the thickened pieces are abutted against an inner surface of the second lateral walls.

7. The luggage case as claimed in claim 1, wherein the case is provided with a plurality of assembling holes for assembling of rigid protection member at each of the arc-shaped corners.

8. The luggage case as claimed in claim 1, wherein a plurality of aligned apertures which will be aligned after folding, and are used to fix other fixing members are formed in the first and second overlapping areas.

9. The luggage case as claimed in claim 1, wherein the case is made by thermoplastic composite material, including Polyvinyl chloride, Polypropylene and Polyethylene terephthalate.

10. The luggage case as claimed in claim 1, wherein the case is woven by thermoplastic composite material.

11. A luggage case comprising a case made by a plate, the plate being woven by thermoplastic composite material and subjected to folding and mold pressing process to make the case, the plate including four lateral edges, four corners connected to the four lateral edges, and four holes located close to the four corners; the luggage case being characterized in that:

between each of the holes and two lateral edges of each of the corners are defined a first folding line and an assistant folding line which have equal length and are perpendicular to each other, and between each of the holes and a tip end of a corresponding one of the corners is defined a second folding line.

12. The luggage case as claimed in claim 11, wherein an area between the first and second folding lines is defined as a first overlapping area, an area between the second folding line and the assistant folding line is defined as a second overlapping area, in the first and second overlapping areas are formed a plurality of aligned apertures which will be aligned after folding, and are used to fix other fixing members.

* * * * *